(No Model.)
C. E. SCRIBNER.
TEST SYSTEM FOR MULTIPLE SWITCHBOARDS.
No. 574,006. Patented Dec. 29, 1896.
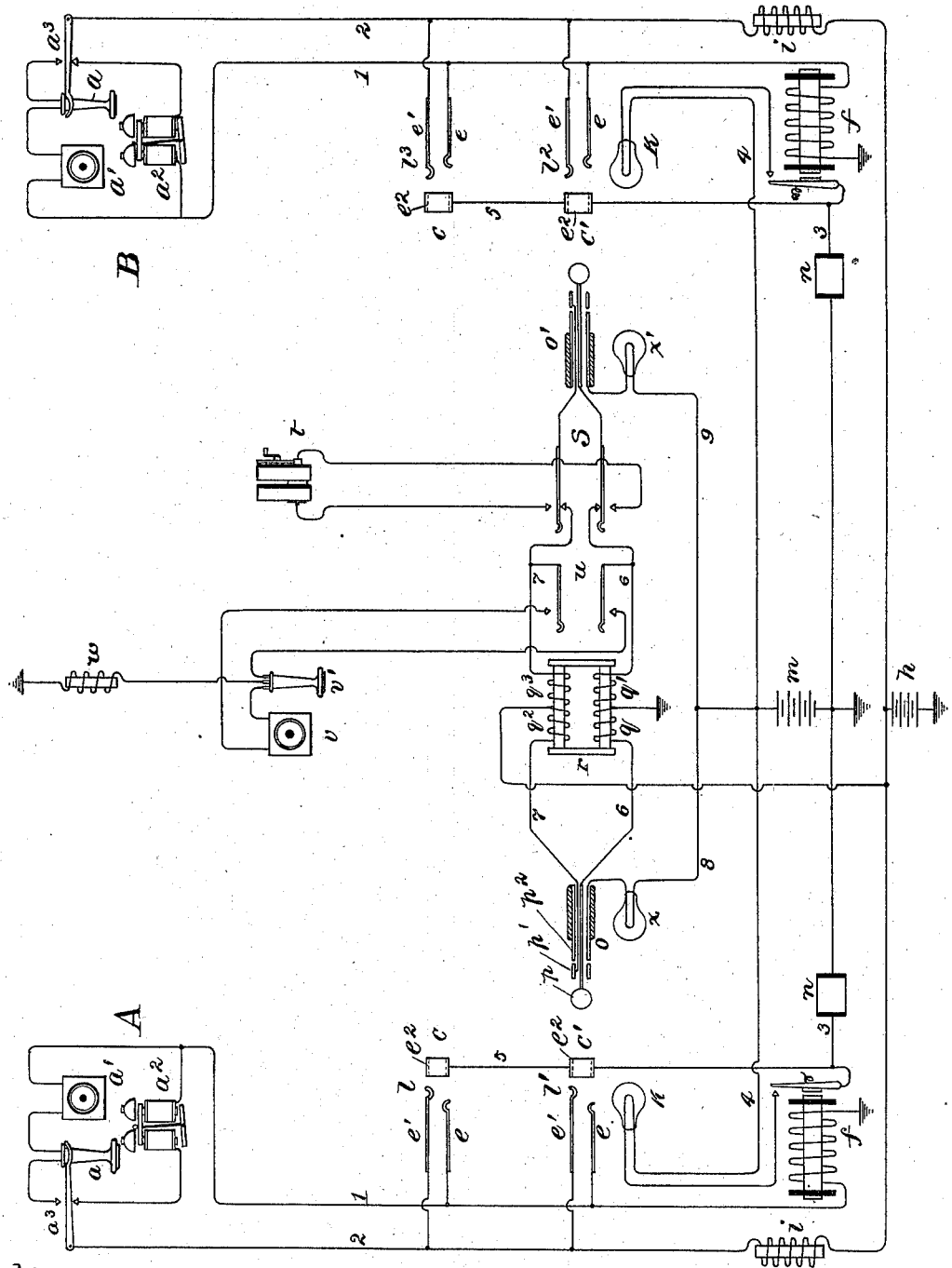
Witnesses:
D. H. C. Tanner,
W. Clyde Jones.
Inventor:
Charles E. Scribner,
By Barton & Brown
Attorneys.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TEST SYSTEM FOR MULTIPLE SWITCHBOARDS.

SPECIFICATION forming part of Letters Patent No. 574,006, dated December 29, 1896.

Application filed July 5, 1895. Serial No. 555,042. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test Systems for Multiple Switchboards, (Case No. 387,) of which the following is a full, clear, concise, and exact description, reference being had to the accompanying drawing, forming a part of this specification.

My invention is a test system for telephone-switchboards of the multiple type, embracing both a visible and audible test-signal, to indicate to the operator making connection with the line whether the line be free for use or not. It consists, substantially, in the combination of two independent systems of testing, which are typified in my prior applications, Serial No. 540,066, filed February 28, 1895, (Case No. 376,) and Serial No. 540,067, filed February 28, 1895, (Case No. 378,) respectively.

The test system of my present invention, like those of the earlier applications mentioned, applies particularly to switchboards in which subsidiary signaling instruments associated with the spring-jacks in the switchboard are arranged in local circuits controlled by relays actuated in the use of the substation-telephones.

In the systems of testing commonly in use in multiple telephone-switchboards the test at any section of the switchboard to determine whether a line is in use at some other section of the switchboard is made by applying to the exposed test-contact of the line spring-jack the tip of the connecting-plug which is about to be inserted into the spring-jack, this act causing a click or other characteristic sound in the operator's telephone if the line be in use. The test system disclosed in the former of the prior applications mentioned is of this type. The latter of the prior applications is based upon a new mode of testing in which the operator inserts the connecting-plug immediately into the spring-jack of the required line, after which a visible signaling instrument, which may preferably be one of the supervisory signals associated with the connecting plugs, indicates by the condition which it assumes whether the line be in use.

In my present invention I have effected a combination of these two test systems, making a composite test system which possesses special advantages. The former of the two modes of testing, the "click-test" in the operator's telephone, involves the operator's pausing to apply the tip of the connecting-plug once or several times to the test-ring of the spring-jack before inserting the plug into any spring-jack, and hence involves a delay in the insertion of the plug in the act of making each connection. This test results in a "busy" indication only occasionally—as, for example, once in ten or fifteen connections. Obviously the pause before making each connection is a waste of the operator's time. This waste is obviated in the second of the above-described test systems. In this process the operator inserts the plug into the spring-jack without any pause to make a test to determine whether the line be in use; but upon observing the supervisory signal associated with the inserted plug, which may preferably be placed near the calling-key which she is required to operate in completing the connection, she perceives at once by the condition of the signal whether the line into which she has inserted the plug be free for the connection, and if it be not free she will remove the plug. This mode of testing would, therefore, involve the removal of the plug from the spring-jack because the line would be found busy once in ten or fifteen times. In general, this results in a saving of time over the other test system, but in making connections in which the operator must reach to a distance on the multiple switchboard a loss of time is occasioned by the necessity of returning to the visible signal to determine whether the line into which the plug has been inserted be free.

In the combined system which forms the subject of this application the operator making connections for which she must reach to a distance may use the click-test, perceiving an audible indication in her telephone if the line be in use, while in making connections over a limited area in the switchboard and within easy reach she may ignore the click-test, using the visible indication of the signal to determine the condition of the line. Further, each mode of testing may be employed to furnish a check upon the other, so that the danger of making connection with busy-lines may be reduced. Thus while each of the systems possesses its particular advantages and disadvantages the two modes are in a manner complementary to each other.

In applying my invention in a telephone-switchboard in which telephone-lines terminate having relays controlling subsidiary signals in the switchboard a special test-contact may be provided in each spring-jack of the line, the different test-contacts being connected together. One of the switch-contacts of the relay is connected to earth through a resistance-coil, and is also connected with the test-rings of the line. The other is connected through the subsidiary line-signal, as a signal-lamp, to one terminal of a battery whose other pole is grounded. A contact-piece of a connecting-plug adapted to register with the test-ring of the spring-jack is connected through one of the supervisory signals to the same battery. From the tip of the connecting or "test" plug a conductor is led through the operator's receiving-telephone to earth. In the normal condition of the line-circuit—that is, when the substation-telephone is upon its switch-hook and no connection exists with the line at the central station—the switch-contacts of the relay are separated and the test-contacts of the spring-jacks are disconnected from all sources of current and are grounded directly. If now the tip of the testing-plug be applied to the test-ring, no test-current is produced through the operator's telephone, since no source of current is included in the testing-circuit and the line tests free; or if the connecting-plug be inserted fully into the spring-jack current in the local circuit is diverted through the supervisory signal and excites it, showing by its indication also that the line is free. If the line were in use, either on account of the receiving-telephone having been removed from its switch-hook to transmit a signal or on account of a connection already existing at a different section of the switchboard, the local circuit, including the battery mentioned, would be closed to the test-ring, so that if the test-plug were applied to the test-ring current would be produced through the telephone, or if the plug were inserted into the spring-jack the supervisory signal would be shunted by another similar signal and would fail to respond, thus indicating the busy condition of the line.

I have shown a suitable form of my invention in the accompanying drawing.

In the drawing two substations A and B are represented terminating in spring-jacks upon different sections $c$ and $c'$ of a multiple switchboard at the central station D. The apparatus at the substation consists of a receiving-telephone $a$, a transmitting-telephone $a'$, a signal-bell $a^2$, and a telephone-switch $a^3$, arranged to close the line-circuit alternately through the bell and the telephone appliances. The telephone instruments may be of the usual "common battery" type, which have an aggregate normal resistance of one or two hundred ohms. The bell should have a high resistance—for example, five thousand ohms.

The substation apparatus, as at station A, is connected by line conductors 1 and 2 with the switching and signaling apparatus at the central station. Line conductor 1 is led to a spring-contact $e$ in a spring-jack upon each section $c$ and $c'$ of the multiple switchboard. Conductor 2 is similarly connected with the spring-contacts $e'$ of the same spring-jacks. Conductor 1 is continued, after its connection with the spring-jacks, through the magnet-helix of a relay $f$, and to earth. Conductor 2 is led through an impedance-coil $i$ to one pole of a battery $h$, which is common to the different lines of the exchange. The strength of battery $h$ should be such that the current produced through bell $a^2$ at the substation will be insufficient to operate the relay $f$, but that when the low-resistance path is closed at the substation through the telephone instruments $a$ and $a'$ the relay shall be excited. Relay $f$ is provided with contact-points which control the continuity of a local signaling-circuit 3 4, which includes a signal-lamp $k$, permanently associated with one of the spring-jacks $l'$ at one section $c'$ of the multiple switchboard. The lever of the relay is connected by conductor 3 with the grounded pole of a local battery $m$ through a resistance-coil $n$, while the forward contact constitutes the normally open terminal of a conductor 4, which includes signal $k$, and leads to the free pole of battery $m$. In addition to its two spring-contacts each spring-jack has a contact ring or thimble $e^2$, which serves as a test-contact. The different rings $e^2$ of each line are connected together through a conductor 5, which joins the conductor 3 after the latter has passed through the resistance-coil $n$.

Two connecting-plugs $o$ and $o'$, being the different members of a pair, are furnished for the use of the operator in establishing connection between different lines. Each plug comprises three contact portions $p$, $p'$, and $p^2$, which are constructed to register with the different contacts $e$, $e'$, and $e^2$ of a spring-jack. The tips $p$ of the two plugs are united through a conductor 6, which includes two helices $q\,q'$ of an induction-coil or transformer $r$. The contact-rings $p'$ are united through another conductor 7 of the plug-circuit, including two other coils $q^2\,q^3$ of the same induction-coil. The usual calling-key $s$ for disconnecting plug $o'$ from its mate and connecting its terminals with the poles of generator $t$ of signaling-current is included in the plug-circuit 6 7; also, a listening-key $u$ is furnished for bridging the operator's telephone set $v$ across the plug-circuit. The center of the magnet-coil of the receiving-telephone $v'$ is grounded through the impedance-coil $w$ for testing purposes.

Contact-piece $p^2$ of plug $o$ constitutes the terminal of a branch 8 from the local battery $m$, including a signal-lamp $x$. This lamp is associated with the plug $o$, and in its indication refers to the line with which that plug is connected. In practice it may be placed near the cord, in the cord-shelf of the switchboard. The corresponding contact-piece of plug $o'$ forms the terminal of a similar conductor 9, including a signal-lamp $x'$.

The apparatus is represented in the drawing in its normal or idle condition. If a telephone at a substation be removed from its switch-hook for use, a current is produced by battery $h$ in the line-circuit, which excites the relay $f$, and thus closes the circuit 3 4, including the line signal-lamp $k$. The illumination of this signal-lamp calls the operator's attention to the spring-jack of the calling-line, and she makes connection with the line by inserting the answering-plug $o$ of the pair into the spring-jack, as $l'$. The insertion of this plug continues the line conductors 1 and 2 through the corresponding contact-pieces $e$ and $e'$ of the spring-jacks and thence to the conductors 6 and 7 of the plug-circuit, where a path is found through helices $q$ and $q^2$ of induction-coil $r$ and through battery $h$. The battery $h$ thus creates through the low-resistance helices $q$ and $q^2$ a current through the line-circuit sufficient to excite the transmitting-telephone $a$ and the signaling subscriber is permitted to give his order for the connection required. The telephonic variations of current produced in the closed circuit traced are repeated through helices $q'$ $q^3$ into the circuit of the operator's telephone $v'$, the key $u$ being in position to connect the telephone with the plug-circuit.

When plug $o$ is inserted into the spring-jack, the contact-piece $p^2$, registering with the contact-ring $e^2$ of the spring-jack, completes a branch of the local circuit through conductor 8 and conductor 5 to wire 3. The local circuit, including the two signal-lamps, may now be considered as being divided into two branches, one of which is through the relay-contacts, through lamp $k$, and conductor 4, to battery $m$, and the other of which is from conductor 3, through contacts $e^2 p^3$, conductor 8, and lamp $x$, to battery $m$. The resistance of coil $n$ is such that the current through the local circuit is insufficient to fully illuminate the two signal-lamps when they are thus placed in parallel, so that lamp $k$ is extinguished, while lamp $x$ remains unlighted.

Having receivetd he subscriber's order, the operator proceeds to test to determine whether the line called for—for example, line to station B—be free for use or not, using either or both of the modes of testing at her convenience. This may now be traced.

It will be observed that in the normal condition of the apparatus—that is, when the substation-telephone is on its switch-hook and when no connection exists with the line—the test-rings $e^2$ of the spring-jacks are grounded through wires 5 and 3. Hence when in testing for the click-test the operator applies the tip of plug $o'$ to test-ring $e^2$ of spring-jack $l^2$ when the line is free no sound is perceived in receiving-telephone $v'$. A circuit is formed from ground through conductor 3 and conductor 5 to test-ring $e^2$, thence to the tip of the plug, thence through a portion of conductor 6 of the plug-circuit to the telephone $v'$, and through impedance-coil $w$ to earth. This circuit contains no source of current. It will be observed that interference from battery $h$ is avoided by grounding the conductor 6 of the plug-circuit, so that the potential of that circuit is zero. The line tested might, however, have been in use in either of two ways. The substation-telephone might have been removed from its switch-hook for use or a connection might have been already completed with the line. In the former case the contacts of relay $f$ would be closed, and hence battery $m$ would be found connected through conductor 4 and conductor 5 with the test-rings, a difference of potential between the test-rings and earth thus being maintained on account of the resistance of coil $n$. In the latter contingency the same battery would be connected with the test-rings through conductor 8 of the plug-circuit by which the existing connection was completed, so that a similar difference of potential would be caused. In either event the application of the tip of plug $o'$ to the electrified test-ring $e$ would permit current to flow through the conductor 6 of the plug-circuit and through one-half of the magnet-coil of receiving-telephone $v'$, through impedance-coil $w$, to earth. A click would be produced in the telephone at each application of the test-plug to the test-ring. Suppose now that the operator inserts the plug $o'$ into the spring-jack. Conductor 9, including signal-lamp $x'$, is now connected with wire 5, and hence with the grounded pole of battery $m$. If the line be free, the contacts of the relay $f$ are separated and the entire current from battery $m$ will find circuit through conductors 9, 5, and 3 to ground. The lamp $x'$ thus will be lighted, its illumination being an indication to the operator that the line into which the plug has been inserted is not in use. With this mode of testing also the signal denoting that the line is free will not be given in the event of the existence of either of two conditions in the line. If the telephone were off its switch-hook at the substation, the contact-points of the relay $f$ would be closed, so that when the connection was made with the line-circuit the conductor 9, with its included signal-lamp $x'$, would be brought into parallel with the lamp $k$ of line to station B when the plug was inserted, and the lamp $x'$ would fail to be illuminated; or if a plug were inserted at another spring-jack, as $l^3$, of the same line another conductor 8 or 9 would be connected from battery $m$ to the rings $e^2$ of the spring-jacks, so that the current from these rings to earth through resistance-coil $n$ would be divided between the two lamps and the lamp $x'$ would remain unlighted. These circuits may be traced in a little greater detail.

Assuming that a connection exists with spring-jack $l^3$ at the section $c$ of the switchboard, an existing circuit will be found from battery $m$ to conductor 9 of the plug in the spring-jack $l^3$, thence to the ring $e^2$ of the jack, thence through wires 5 and 3, including coil $n$, to ground. When now the plug $o'$ is inserted by the operator at section $c'$ of the switchboard into spring-jack $l^2$, another path is formed from battery $m$ through conductor 9, terminating in this plug, to the ring $e^2$ of jack $l^2$, from which its only path to ground is also through the wires 5 and 3, including the resistance-coil $n$. The current through coil $n$ is thus divided between the two lamps $x'$, associated with the two plug-circuits which are connected with the line, and the lamp $x'$ at board $c'$ will remain unlighted.

To recapitulate, the operator may first apply the tip of plug $o'$ to the ring $e^2$, whereupon, if the line be free, she will perceive no sound in her telephone; but if it be in use she will hear a click, or she may insert the plug $o'$ immediately into the spring-jack of the line called for, after which, if the line be free, she will find the lamp $x'$ lighted, or if it be in use she will find the lamp extinct.

As has been pointed out generally before, the operator may choose either of these modes of testing which is more convenient in any particular instance. If the spring-jack with which she is required to make connection be at a distance, she may find it preferable to apply the tip of the plug to the test-ring of the spring-jack before inserting the plug for the purpose of obtaining the immediate click-test and avoiding the return to the supervisory signal $x'$ to determine the condition of the line, or if, on the other hand, the line be within easy reach she may insert the plug immediately into the spring-jack and may remove it if upon observing the supervisory signal $x'$ she finds it dark, or, if desired, she may employ both systems of testing, using each as a check upon the other.

I claim as new—

1. In a multiple switchboard, spring-jacks connected in multiple with the line, a test-contact in each jack, all the test-contacts being electrically connected together, means for making connection with the line and simultaneously altering the electrical condition of the test-contacts thereof, a testing-plug adapted to be applied to the test-contacts, and a telephone in circuit therewith adapted to indicate the said altered electrical condition, a connecting-plug and a visible signal in circuit with the plug adapted to indicate said altered condition, as described.

2. The combination with a telephone-line, of several spring-jacks on different sections of a multiple switchboard connected with the line, a test-ring in each spring-jack, means for changing the electrical condition of the test-rings when connection is made with the line, a test-contact adapted to be applied to the test-ring of a spring-jack, and a signaling instrument in circuit therewith to indicate the electrical condition of the test-ring, a connecting-plug for insertion into the spring-jack, and a local circuit completed through registering contacts of the connecting-plug and spring-jack, a visible signal in the local circuit, and means for diverting current from the visible signal when the line is in use, substantially as described.

3. The combination with a telephone-line connected with several spring-jacks in multiple, of test-contacts in the different spring-jacks electrically connected together, means for connecting a source of current with the test-contacts while the line is in use, a testing-plug adapted to be applied to a test-contact having in circuit with it a receiving-telephone, a connecting-plug adapted for insertion into the spring-jack, a contact-piece therein registering with the test-contact of the spring-jack, and a branch terminating in the said plug-contact from the circuit of the test-battery, including a visible signal, whereby a click-test and a visible test are provided, substantially as described.

4. The combination with a telephone-line connected with different spring-jacks in multiple, of a test-contact in each spring-jack, the different test-contacts being connected together and being grounded, of a relay in the line-circuit responding to current therein controlling the connection of a battery with the test-contacts, connecting-plugs having branches from the same battery terminating in contacts adapted to register with the test-contacts of the spring-jacks, and a test-plug having a tip adapted for application to a test-contact, connected to earth through a receiving-telephone, and having a contact-piece adapted to register with the test-contacts connected with the battery-circuit and including a lamp-signal, substantially as described.

5. The combination with a telephone-line connected with several spring-jacks in multiple, of test-contacts in the different spring-jacks connected together and grounded through a resistance-coil, different connecting-plugs, each having a tip connected through a receiving-telephone to earth, and a sleeve constructed to register with the test-contact of a spring-jack connected through a lamp-signal to one pole of a grounded battery, whereby an existing connection with a spring-jack is indicated audibly when the tip of a plug is applied to a test-contact, and visibly when the plug is inserted into the spring-jack, substantially as described.

6. The combination with a telephone-line connected with several spring-jacks in multiple, of test-rings in the different spring-jacks electrically connected together and to earth through a resistance-coil, a relay in the line-circuit responding to current therein, and a battery whose connection with the test-contacts is controlled by the contacts thereof, connecting-plugs for insertion into the spring-jacks, each having a tip forming the terminal of a ground branch including a receiving-telephone, a sleeve adapted to register with the test-contact, and a branch from the same battery including a signal-lamp terminating in each such sleeve, whereby both an audible and a visible test-signal are provided to indicate either the existence of current in the line-circuit or the presence of a plug in a spring-jack.

7. The combination with a telephone-line connected with several spring-jacks in multiple, each having a test-contact, of connecting-plugs, a supervisory signal associated with each connecting-plug, and means for causing the display of the signal during the idleness of the telephone of the line with which the plug is connected, and means for diverting the exciting-current from the supervisory signal when connection is made with a different spring-jack of the line, a testing-tip in the plug and a test-circuit terminating therein, including the operator's receiving-telephone, adapted to indicate the busy or idle condition of the line, whereby the operator is enabled to test a line by applying the plug-tip to a test-contact, or by inserting the plug into the spring-jack and observing the supervisory signal, substantially as described.

In witness whereof I hereunto subscribe my name this 13th day of June, A. D. 1895.

CHARLES E. SCRIBNER.

Witnesses:
ELLA EDLER,
MYRTA F. GREEN.